United States Patent

Matsushiro et al.

[11] Patent Number: 5,870,678
[45] Date of Patent: Feb. 9, 1999

[54] CORDLESS TELEPHONE APPARATUS

[75] Inventors: Takashi Matsushiro; Ikuhiro Yamamoto, both of Kasuga; Katsuyuki Kajiwara, Kasuya; Hideaki Muroi, Fukuoka, all of Japan

[73] Assignee: Matsushita Electric Industrial Co., Ltd., Osaka, Japan

[21] Appl. No.: 571,172

[22] Filed: Dec. 12, 1995

[30] Foreign Application Priority Data

Dec. 22, 1994 [JP] Japan ................................. 6-320225

[51] Int. Cl.[6] .................................................. H04Q 7/00
[52] U.S. Cl. ...................... 455/464; 455/462; 455/574
[58] Field of Search .................................... 455/464, 463, 455/462, 455, 511

[56] References Cited

U.S. PATENT DOCUMENTS

| | | | |
|---|---|---|---|
| 4,694,485 | 9/1987 | Iwase | 455/464 |
| 4,768,219 | 8/1988 | Yamagata | 455/464 |
| 5,044,010 | 8/1991 | Frenkiel | 455/464 |
| 5,247,567 | 9/1993 | Hirano | 455/464 |
| 5,375,163 | 12/1994 | Kamimoto | 455/464 |
| 5,384,827 | 1/1995 | Orikassa | 455/464 |
| 5,418,839 | 5/1995 | Knuth | 455/464 |
| 5,428,669 | 6/1995 | McCarthy | 455/464 |
| 5,442,809 | 8/1995 | Diaz et al. | 455/511 |

FOREIGN PATENT DOCUMENTS 4-341024A   11/1992   Japan.

*Primary Examiner*—Curtis A. Kuntz
*Assistant Examiner*—Myron K. Wyche
*Attorney, Agent, or Firm*—Stevens, Davis, Miller & Mosher, L.L.P.

[57] ABSTRACT

A cordless telephone is composed of a base unit connected to a telephone line and a handset unit capable of radio communications with the base unit. When the handset unit or the base unit initially transmits radio waves for forming a radio link, a channel is selected from a group of channels through which transmission is permitted irrespective of their electric field states, and the radio waves are transmitted through the selected channel. After the radio link has been formed, a speech channel is selected from all channels through which transmission is permitted. In this way, when the base unit or the handset unit initially transmits control data, the transmission is immediately carried out irrespective of an electric field state on the selected channel, whereby the radio link can be established in a reduced time. Further, when a speech communication is started, 15 channels additionally provided by the revised standard can be effectively utilized.

17 Claims, 12 Drawing Sheets

FORMAT FOR DATA TRANSMITTED
FROM BASE UNIT TO HANDSET UNIT

CORDLESS TELEPHONE APPARATUS

BACKGROUND OF THE INVENTION

The present invention relates to a cordless telephone apparatus.

A cordless telephone apparatus composed of a base unit (base unit) connected to a telephone line and one or more handset units (handsets) for communicating with the base unit through radio waves has been widespread. In the United States, for example, ten channels (10 CH) have been assigned to the cordless telephone apparatus in a 46 MHz band and a 49 MHz band. The FCC standard defines in terms of these ten channels that it is not necessary to determine whether an electric field is present on a channel selected from the ten channels to be used (whether any signal is being received on the channel) before starting transmission of speech or control data on that channel, and therefore the transmission of speech or control data can be started on that channel even if an electric field is detected (for example, even if another cordless telephone apparatus is using the same channel).

Conventionally, for completing a connection between a base unit and a handset unit through a radio channel (hereinafter called the "radio link") in a reduced time, the cordless telephone apparatus manufactured based on the above-mentioned standard establishes the radio link in the following method.

When the base unit or the handset unit starts transmission, the transmission side utilizes the last used channel through which the previous radio link was formed between the base unit and the handset unit for communication, and control data is communicated therebetween through this channel to form the radio link. While the base unit and the handset unit subsequently proceed to a speech state, the base unit performs an electric field detection on the channel before entering the speech state. If no problems are found in terms of the control channel in this detection, the same channel as the control channel is used as a channel for speech communications (hereinafter called the "speech channel") through which the base unit and the handset unit enter the speech state.

However, if the electric field detection reveals that the channel is being used by another radio device with a high possibility (hereinafter a channel in use is referred to as a channel presenting a strong electric field), the base unit examines whether there are other empty channels (hereinafter, an empty channel is referred to as a channel presenting a weak electric field), selects one if empty channels are found, and determines that the selected channel is used as the speech channel. Then, the base unit transmits to the handset unit information indicative of the speech channel thus selected, a transmission frequency and a reception frequency are set to the frequency of the selected channel for both the base unit and the handset unit, and thus a speech communication is enabled through this channel.

As described above, conventionally, the base unit performs the electric field detection on a channel for proceeding to the speech state. If the channel presents a strong electric field, the base unit selects a speech channel from other channels which can be confirmed to be empty, so that the speech state may be occasionally entered through a different speech channel from the control channel through which control data was initially transmitted. Then, when another call is to be made after this speech communication has been ended, the channel last used for establishing the previous radio link between the base unit and the handset unit is used as a control channel through which control data is communicated therebetween, similarly to the above.

The FCC standard is to be revised after August 1995, and 15 channels are newly added to the conventional ten channels, so that a total of 25 channels are available for communications with the cordless telephone apparatus. Among these 25 channels, the conventional ten channels are newly assigned channel numbers 16CH–25CH without any change in frequency. The newly added 15 channels are assigned a lower frequency band than the conventional frequency band and new channel numbers 1CH–15CH, respectively.

As before, the transmission of speech or control data is permitted to start through one of the conventional ten channels, i.e., 16CH–25CH irrespective of its electric field state (the conventional ten channels are hereinafter referred to as the "channel group 1"). However, the revised standard defines that the newly added channels 1CH–15CH belong to a group of channels through which the transmission of speech or control data is permitted to start only after confirming that a weak electric field is present on the channels (hereinafter referred to as the "channel group 2").

Thus, the 25 channels are divided into:
Channel Group 1: 16CH–25CH
Channel Group 2: 1CH–15CH If the standard is revised as described above, the channels assigned to the cordless telephone apparatus will partially include a group of channels through which transmission is not permitted depending on their electric field states (channel group 2). When a call is made in the conventional method, the last channel used in the previous radio link, which will serve as a control channel in the next call, can be a channel belonging to the channel group 2. Thus, even if this channel is to be used as the control channel, it is not available when a strong electric field is detected on that channel. In this case, it is necessary to immediately look for a channel presenting a weak electric field among other channels, whereby a radio link may be occasionally formed with a large delay. This causes a problem that a cordless telephone apparatus cannot be used immediately at the time it is required.

SUMMARY OF THE INVENTION

The present invention has been made in view of the prior art mentioned above, and its object is to provide a cordless telephone apparatus which is capable of effectively utilizing the newly added 15 channels in the revised standard as well as of establishing a radio link in a short time.

To achieve the above object, the present invention provides a cordless telephone apparatus which comprises a base unit and a handset unit, both of which have a radio transmitter and a radio receiver. The handset unit and the base unit each include a channel information memory for storing information indicative of a control channel. The handset unit and the base unit each include control means for selecting and determining a control channel from channels belonging to a channel group 1 using a conversion method common to the base unit and the handset unit. As mentioned above, the channel group 1 refers to a group of channels through which transmission of speech or control data is permitted to start irrespective of the electric field state.

With the configuration described above, since the first communication is usually performed using a channel selected from the channel group 1 upon starting a call, either the base unit or the handset unit, which is to start the transmission, is allowed to immediately do so, irrespective of an electric field state on the selected channel, to establish a radio link in a reduced time between the base unit and the handset unit. In addition, upon starting a speech communication, the 15 channels newly added by the revised standard can be effectively utilized.

Also, since a channel belonging to the channel group 2 is preferentially utilized when a speech communication is started, a good speech communication can be achieved with less noise.

DESCRIPTION OF THE PREFERRED EMBODIMENTS

Several embodiments of the present invention will hereinafter be described with reference to the accompanying drawings. It should be noted that while a cordless telephone apparatus described below includes only one handset unit for the sake of explanation, a plurality of handset units may be additionally provided for a base unit.

Figure 1:
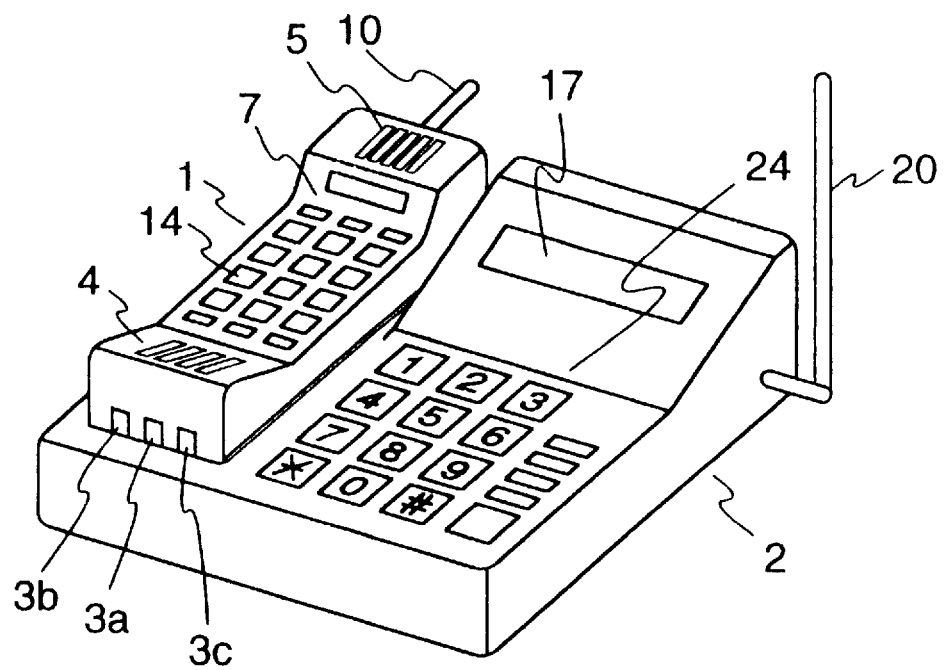
FIG. 1 is a schematic perspective view showing a cordless telephone apparatus according to an embodiment of the present invention.
Figure 2:
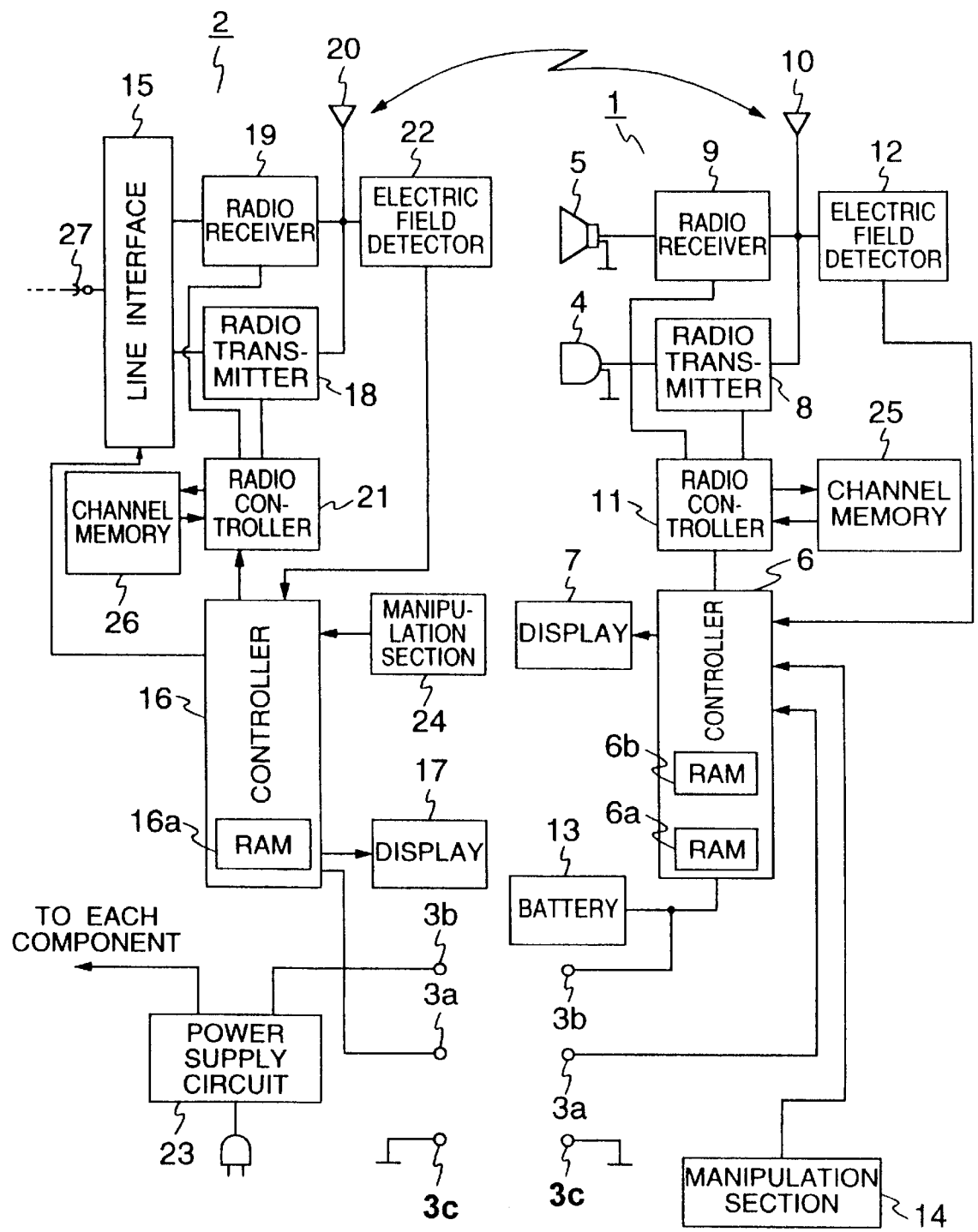
FIG. 2 is a block diagram showing the configuration of the cordless telephone apparatus according to the embodiment of the present invention.

FIG. 1 shows a schematic perspective view of a cordless telephone apparatus according to one embodiment of the present invention, and FIG. 2 is a block diagram showing the configuration of the cordless telephone apparatus according to the embodiment. In FIGS. 1 and 2, the cordless telephone apparatus is composed of a handset unit 1 and a base unit 2, which can remotely communicate with each other within a predetermined distance (100–150 m). The handset unit 1 has three terminals on its bottom (the side appearing on the drawing). The central terminal is a control terminal 3a, and the other two terminals on both sides thereof are recharging terminals 3b and 3c. The handset unit 1 is a so-called reversible and rechargeable type. This means that the handset unit 1 may be placed on the base unit 2 in a normal posture or in an up-side-down posture because the three terminals 3a, 3b and 3c of the handset unit 1 are brought into electrical contact with corresponding three terminals on the base unit 2 for recharging batteries mounted in the handset unit 1, irrespective of which side of the handset unit 1 is directed upwardly when the handset unit 1 is placed on the base unit 2. With this structure, if the handset unit 1 is placed on the base unit 2 so as to direct its manipulation section upwardly as shown in FIG. 1, a telephone number can be inputted in an on-hook state by manipulating the handset unit, even if the battery in the handset unit 1 is being recharged.

The handset unit 1 will be next described in greater detail with reference to FIG. 2. The handset unit 1 includes a speech transmitter 4 and a speech receiver 5. The speech transmitter 4 is mainly formed of an electret condenser microphone, a dynamic microphone, or the like, while the speech receiver 5 is mainly formed of a speaker or the like. A controller 6 responsible for the general control of the handset unit 1 is composed of a central processing unit (CPU), read only memories (ROM), random access memories (RAM), and so on, and controls the components of the handset unit 1 when starting a call, when transmitting or receiving control data, and when detecting an electric field. The controller 6 also controls a display 7 formed of liquid crystal, light emitting diodes (LED), or the like for displaying an indication of a reception of a call, and so on.

A radio transmitter 8 converts speech signals to radio waves for transmission, and a radio receiver 9 receives, detects and demodulates incoming radio waves to restore speech signals. An antenna 10 for receiving and transmitting radio waves, is generally implemented by a helical antenna or the like for reducing the size of the handset unit 1. The handset unit 1 also includes a radio controller 11 for controlling channels used for transmission and reception; a channel memory 25 for storing information on channels; an electric field detector 12 for detecting an electric field based on the strength of an incoming signal from the antenna 10; a battery 13 serving as a power supply for operating the handset unit 1; and a manipulation section 14 for inputting a telephone number or the like.

Next, the base unit 2 will be described in detail again with reference to FIG. 2. A controller 16 responsible for the general control of the base unit 2 is composed of a central processing unit (CPU), read only memories (ROM), random access memories (RAM), and so on, and controls components of the base unit 2 when starting a call, when transmitting or receiving control data, and when detecting an electric field. The controller 6 also controls a display 7 formed of liquid crystal, light emitting diodes (LED), or the like for displaying an indication of a reception of a call, and so on.

A telephone line 27 is connected to a line interface 15 for the connection of the base unit 2 with the telephone line 27. The line interface 15 has functions such as a conversion between two lines and four lines, detection of a received signal, formation of a direct current loop, and so on. A radio transmitter 18 converts incoming speech signals from the telephone line 27 through the line interface 15 to radio waves and transmits the radio waves to the handset unit 1 through an antenna 20. A radio receiver 19 receives signals from the handset unit 1 through the antenna 20, converts the received signals to speech signals which are then sent to the telephone line 27 through the line interface 15. The antenna 20 is also implemented by a helical antenna, similarly to the antenna 10 on the handset unit 1.

The base unit 2 also includes a radio controller 21 for controlling channels used for transmission and reception; a channel memory 26 for storing information on channels; an electric field detector for detecting an electric field; and a manipulation section 24 for inputting a telephone number and so on. The base unit 2 is also provided with three terminals which can be contacted with the corresponding terminals on the handset unit 1. The central terminal is a control terminal 3a, and the other two terminals on both sides thereof are recharging terminals 3b and 3c. The recharging terminals 3b and 3c are connected to a power supply circuit 23 which relays to a power supply, such that the battery 13 in the handset unit 1 is recharged by the base unit 2 by electrically connecting the recharging terminals 3b and 3c on the base unit 2 with those on the handset unit 1.

Next, operation steps executed for forming a radio link and determining a control channel for the cordless telephone apparatus thus configured according to the embodiment of the present invention will be described with reference to the accompanying drawings.

(Embodiment 1)

Figure 3:
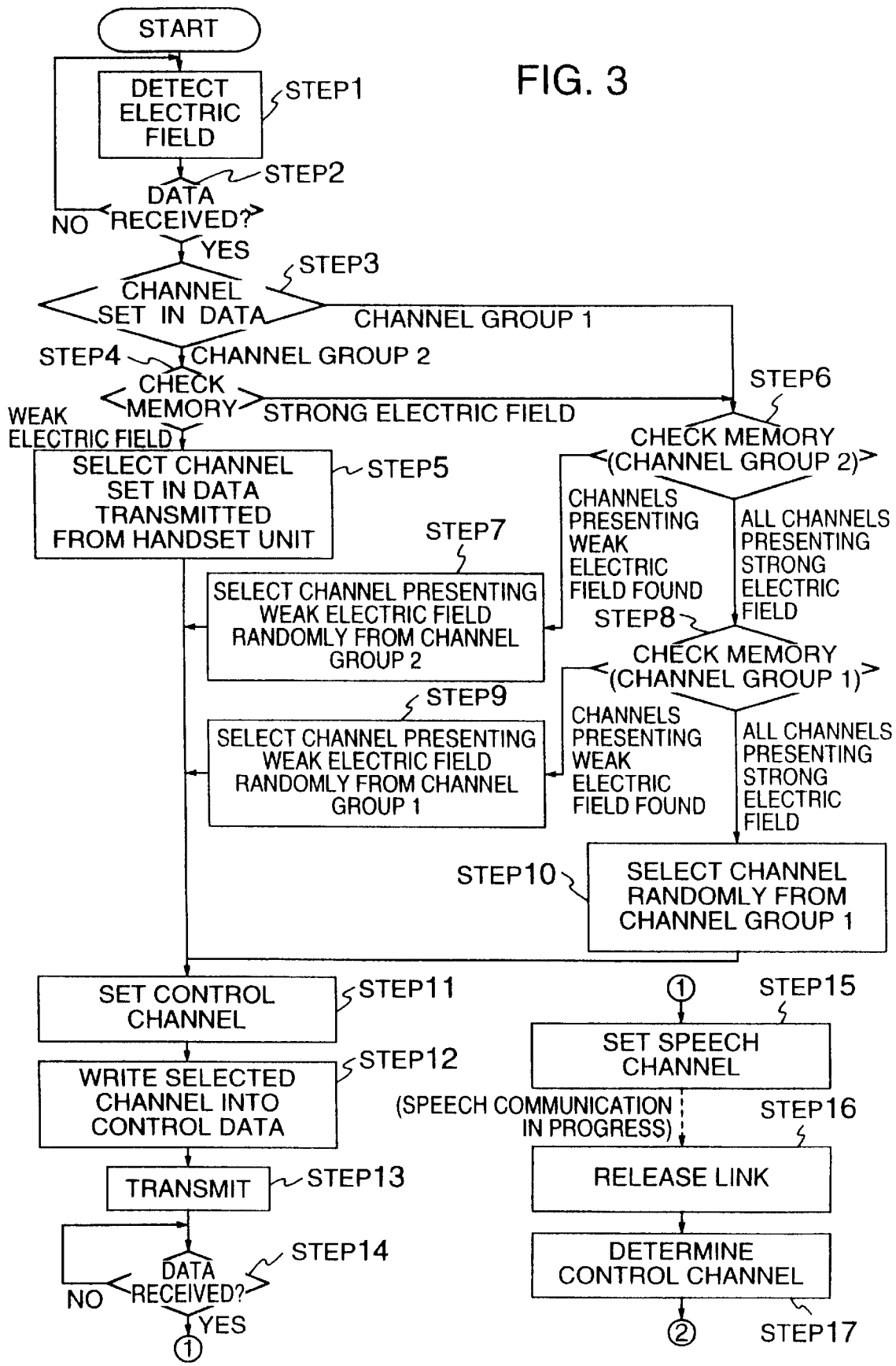
FIG. 3 is a flow chart representing operation steps executed when a radio link is formed for a base unit of the cordless telephone apparatus according to a first embodiment of the present invention.

A first embodiment will be first described along with FIGS. 1, 2, 3 and 4. FIG. 3 is a flow chart representing operation steps executed when a radio link is formed for the base unit 2 of the cordless telephone apparatus according to the first embodiment. Initially, both the handset unit 1 and the base unit 2 are assumed to be in a standby state, wherein the radio receivers 9 and 19 in the respective units are operated to be ready for reception. In this state, the base unit 2 first drives the radio receiver 19 to search all channels belonging to the channel group 1 (16CH–25CH) and the channel group 2 (1CH–15CH), utilizes the electric field detector 22 to detect an electric field state on each of all the channels, and stores information acquired by the electric field detection into the RAM 16a in the controller 16 (step 1 in FIG. 3). The information acquired by the electric field detection performed at this step is referenced from the time when a radio link is formed to the time when the radio link is released. Also, in the standby state, the base unit 2 simultaneously examines whether or not control data is present or absent on a channel indicated by information stored in the channel memory 26 (step 2).

The memory 26 in the base unit 2 stores information indicative of a control channel which was set during the previous call by a method later described. The base unit 2 examines whether or not incoming control data is present or absent on the channel indicated by this information. When the base unit 2 receives control data from the handset unit 1, the flow proceeds to step 3.

Figure 4:
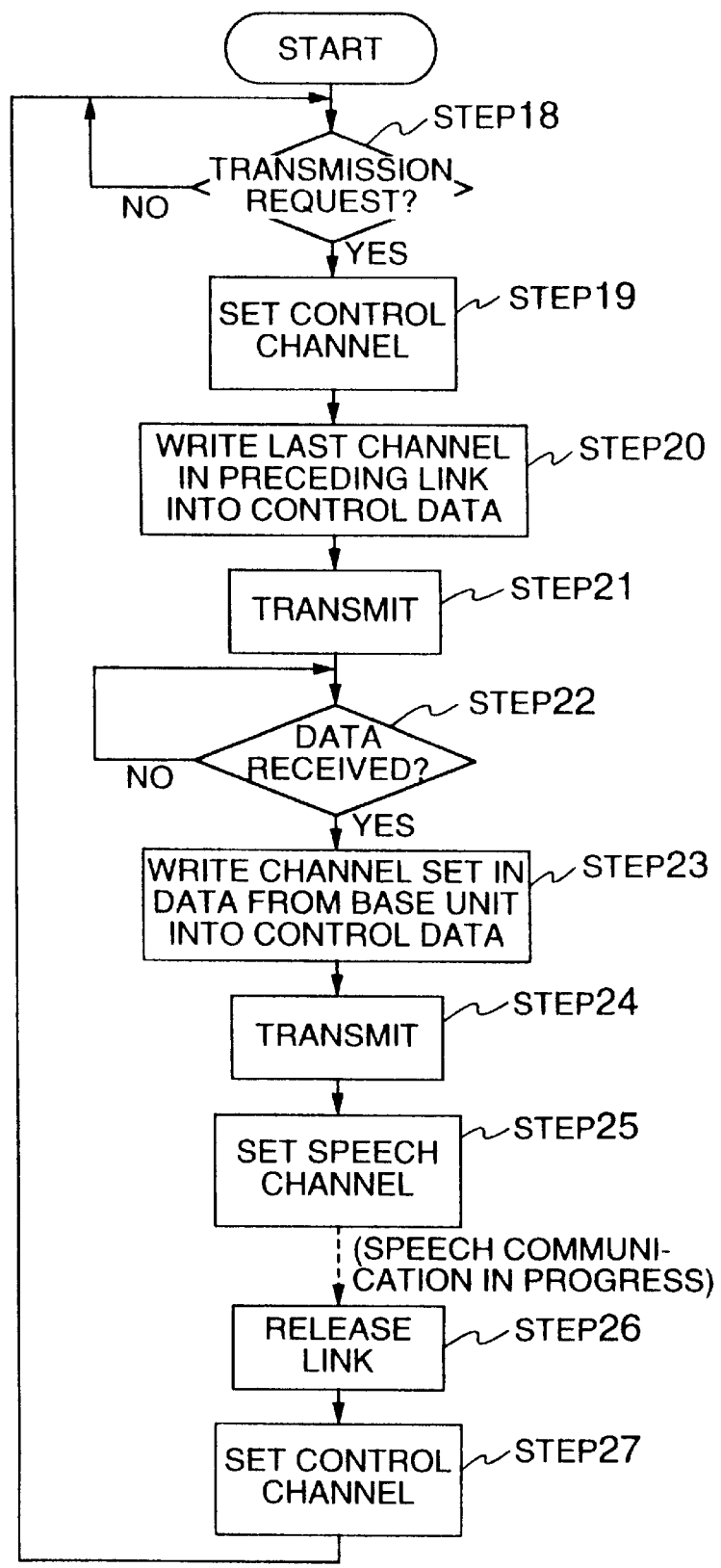
FIG. 4 is a flow chart representing operation steps executed when a radio link is formed for a handset unit of the cordless telephone apparatus according to the first embodiment and a second embodiment of the present invention.

Now, operation steps executed by the handset unit 1 will be described with reference to FIG. 4. The handset unit 1 is waiting for a transmission request in the standby state (step 18). When a transmission request is generated, for example, by a user manipulating the manipulating section 14 on the handset unit 1 for starting a communication with the base unit 2, the handset unit 1, in response to this request, provides the radio controller 11 with information stored in the channel memory 25 to have the radio controller 11 set a channel. In other words, a transmission frequency for the radio transmitter 8 and a reception frequency for the radio receiver 9 are set to the frequency of a channel indicated by information stored in the channel memory 25 (step 19). As is understood, the channel information stored in the channel memory 25 is information on a control channel which was set during the previous call by a method later described. The RAM 6b, in turn, stores information indicative of a speech channel which was last used in the previous radio link.

Next, the handset unit 1 writes the channel information stored in the RAM 6b (information on the channel last used in the previous radio link, preserved in the RAM 6b) into the control data (step 20), and transmits this control data to the base unit 2 (step 21). For the transmission from the handset unit 1, the channel set by the foregoing step 19 is used.

Operation steps executed by the base unit 2 is now described. The base unit 2, when receiving the control data from the handset unit 1 (the answer to step 2 is YES), determines from the channel information contained in the control data whether the channel belongs to the channel group 2 or the channel group 1 (step 3).

If the channel is determined to be the former, i.e., a channel belonging to the channel group 2 at step 3, the base unit 2 reads the results of the electric field detection performed at step 1 from the RAM 16a, and examines the electric field state on the channel (step 4).

If it is determined at step 4 that the channel presents a weak electric field (indicating that the channel is not being used by any other user), the channel indicated by the control data transmitted from the handset unit 1, is selected (step 5), followed by the flow proceeding to step 11.

If the channel is determined to be the latter, i.e., a channel belonging to the channel group 1 at step 3, or if it is determined at step 4 that the channel presents a strong electric field, the base unit 2 reads the results of the electric field detection performed at the foregoing step 1 from the RAM 16a to examine the electric field state on each channel belonging to the channel group 2 (step 6). If channels presenting a weak electric field are found in the channel group 2 (the answer to step 6 is that channels presenting a weak electric field are found), one channel is randomly selected from these channels presenting a weak electric field (step 7), and the flow proceeds to step 11.

On the other hand, if all channels belonging to the channel group 2 are found to present a strong electric field (the answer to step 6 is that all channels present a strong electric field), the base unit 2 reads data on the channel group 1 from the RAM 16a to examine the electric field state on each channel belonging to the channel group 1 (step 8). If channels presenting a weak electric field are found in channels belonging to the channel group 1 (the answer to step 8 is that channels presenting a weak electric field are found), one channel is randomly selected from these channels presenting a weak electric field (step 9), and the flow proceeds to step 11. If all channels belonging to the channel group 1 also present a strong electric field (the answer to step 8 is that all channels present a strong electric field), one channel is randomly selected from all the channels belonging to the channel group 1 (step 10).

At step 11, an operation is executed to transmit information on the channel selected by the foregoing steps 5, 7, 9 and 10 and determined as a speech channel to the handset unit 1 through the control channel. More specifically, information stored in the channel memory 26 (information on a control channel set during the previous call) is provided to the radio controller 21 to set the control channel and to tune a transmission frequency for the radio transmitter 18 and a reception frequency for the radio receiver 19 to the frequency of the control channel stored in the channel memory 26 (step 11).

Next, the information indicative of the channel determined by the foregoing procedure is written into the control data (step 12), and this control data is transmitted (step 13). More specifically, the control data (carrying the information on the determined speech channel) is sent to the handset unit 1 through the control channel.

It should be noted that a speech channel may be selected from all channels belonging to the channel groups 1, 2, without preferentially selecting one from the channel group 2. In the foregoing embodiment, the speech channel is preferentially selected from the channel group 2 because the channels belonging to the channel group 2 advantageously suffer from less interference from other cordless telephone apparatuses when a speech state is entered after the radio link has been established.

Now, operation steps executed by the handset unit 1 will be described with reference to FIG. 4. The handset unit 1, when receiving the control data from the base unit 2 (the answer to step 22 is "YES"), extracts the channel information (information indicative of the speech channel) contained in the control data from the base unit 2, stores the channel information into the RAM 6b in the controller 6, and simultaneously sends control data requesting the base unit 2 to proceed to a speech state through the control channel to the base unit 2 (step 24). Also, for acknowledgement, the handset unit 1 writes the information on the speech channel previously transmitted from the base unit 2 into control data directed to the base unit 2 (step 23), and transmits this control data to the base unit 2. This returns the information on the speech channel sent from the base unit 2 to the handset unit 1 again to the base unit 2, so that the base unit 2 can acknowledge that the information on the speech channel has been transmitted to the handset unit 1.

After the transmission of the control data has been completed, the handset unit 1 next provides the information on the speech channel to the radio controller 11 to control the channel setting. Thus, a transmission frequency for the radio transmitter 8 and a reception frequency for the radio receiver 9 in the handset unit 1 are set to the frequency of the speech channel based on the information stored in the RAM 6b, so that this channel is used as a speech channel in a speech state (step 25).

Next, operation steps executed by the base unit 2 shown in FIG. 1 will be described again referring to FIGS. 3 and 4. The base unit 2, when receiving the control data from the handset unit 1 (the answer to step 14 is "YES"), provides the radio controller 21 with the channel information extracted from the control data (step 15) to control the control the channel setting. Thus, a transmission frequency for the radio transmitter 18 and a reception frequency for the radio receiver 19 in the base unit 2 are set to the frequency of the channel indicated by the channel information, so that this channel is used as a speech channel.

It will be understood that the user can switch the channel by pushing a channel switching button in the manipulation section 14 on the handset unit 1. When the user switches the channel, the speech channel set as described above, is used by the handset unit 1 and the base unit 2 for transmitting and receiving speech and control data until the radio link is released.

After the radio link has been released (step 16 and step 26), the handset unit 1 and the base unit 2 both perform an operation for determining a control channel for the next call by a method later described, store information on a determined channel in the channel memories 25 and 26, respectively, and return to the standby state with the thus set channel assigned to the control channel (step 17 and step 27).

In this embodiment, as described above, the base unit 2 and the handset unit 1 utilize a common conversion method for releasing the radio link and select a channel in the channel group 1 as the control channel to enable the radio link to be usually established in a short time. As an example, a conversion method adapted to the FCC standard in the United States will be described below. As mentioned above, the FCC standard stipulates that channels through which the transmission of speech or control data is permitted to start irrespective of their electric field states are 16CH–25CH (channel group 1), and that channels through which the transmission of speech or control data is permitted to start only after a weak electric field is confirmed thereon are 1CH–15CH (channel group 2).

Figure 5:
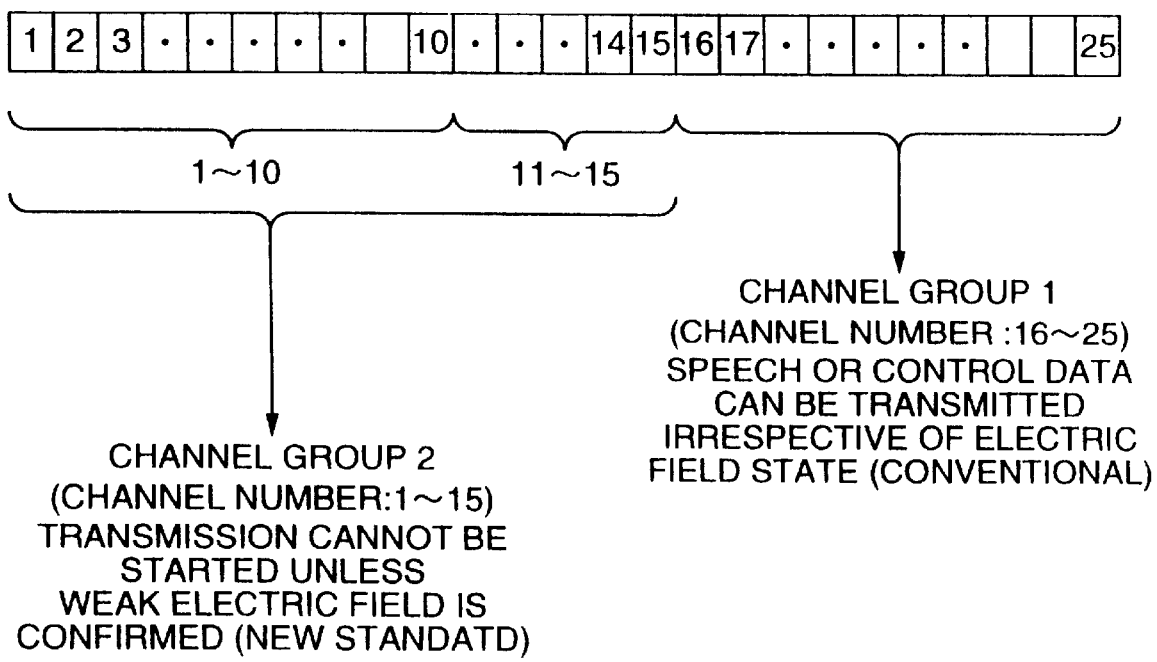
FIG. 5 is an explanatory diagram showing an example of a control channel determination method for the cordless telephone apparatus in the embodiments of the present invention.

A first method for determining the control channel is first described. FIG. 5 shows a diagram for explaining the first determination method. If the last channel used when a radio link was formed at the preceding time is one of the channels 16CH–25CH, this channel belongs to the channel group 1, so that the contents of the channel memory 26 is not updated and this last used channel is assigned to the control channel to be used at the next time.

If the last channel used when a radio link was formed at the preceding time is one of the channels 1CH–15CH, this channel belongs to the channel group 2. In this case, different operations are performed depending on the number of the last used channel. First, if the last used channel is in the range of 1CH–10CH, a value equal to the channel number (1–10) plus "15" is stored into the channel memory 26. Second, if the last used channel is in the range of 11CH–15CH, a value equal to the channel number (11–15) plus "5" is stored into the channel memory 26. A channel having the number equal to the value thus calculated is used as the control channel to be used at the next time.

Next, a second method for determining the control channel is described. In the second determination method, respective values of the first and second digits in the number of the last channel, used when a radio link was formed at the preceding time, are added. Then, "15" is further added to the first digit of the resulting sum. The final value is stored into the channel memory 26 such that the channel having the number equal to this value is used as the control channel at the next time.

The foregoing methods utilize the channel number of the last channel, which was used when a radio link was formed at the preceding time, as a channel number serving as a basis for determining the control channel at the next time. Alternatively, it is also possible to utilize the number of a channel used for establishing a radio link for this purpose. In other words, one and the same channel is selected as the control channel for both the handset unit 1 and the base unit 2 from the channels belonging to the channel group 1 through which the transmission of speech or control data is permitted to start irrespective of their electric field states.

As described above, according to the first embodiment, since a channel belonging to the channel group 1 is usually selected when the radio link is formed, the radio link can be formed in a reduced time irrespective of the presence or absence of an electric field on the selected channel. During a speech communication, the 15 channels newly added by the revised standard, i.e., channels of the channel group 2, are effectively utilized. Additionally, since the channels of the channel group 2 are preferentially used, the speech communication can be achieved with less noise.

(Embodiment 2)

Figure 6:
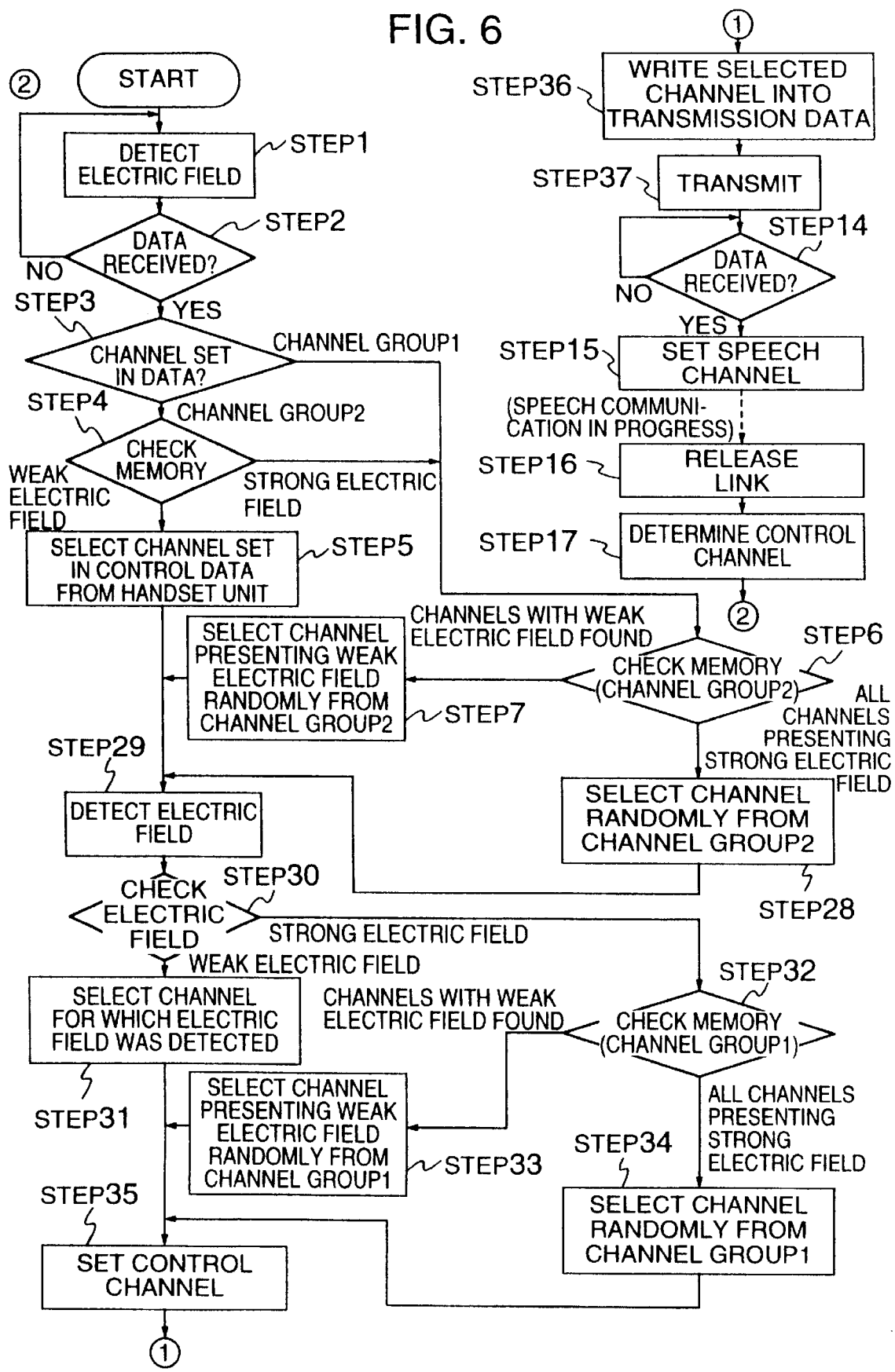
FIG. 6 is a flow chart representing operation steps executed when a radio link is formed for the base unit of the cordless telephone apparatus according to the second embodiment and a third embodiment of the present invention.

In a second embodiment, a step for again detecting an electric field by the electric field detector 22 immediately before the base unit 2 transmits control data to the handset unit 1 is added to the operation steps required to form the radio link for the cordless telephone apparatus in the first embodiment. The main hardware configuration of the second embodiment is similar to that of the first embodiment shown in FIGS. 1 and 2. FIG. 6 is a flow chart representing operation steps executed for forming a radio link for the base unit of the cordless telephone apparatus according to the second embodiment. Only different aspects from the first embodiment will be described below with reference to FIG. 6. It should be noted that the operation of the handset unit 1 in the first embodiment represented by FIG. 4 is also performed in the second embodiment.

At steps 1–6 and step 7 shown in FIG. 6, the base unit 2 performs similar processing to the first embodiment. At step 6 in FIG. 6, the base unit 2 reads the result of the electric field detection performed at step 1 from the RAM 16a, and examines the states of electric fields on the respective channels belonging to the channel group 2. If all the channels of the channel group 2 present a strong electric field (the answer to step 6 is that all the channels present a strong electric field), a channel is randomly selected from all the channels of the channel group 2 (step 28), followed by the flow proceeding to step 29.

At step 29, the electric field detector 22 is used to examine an electric field on a channel selected at steps 5, 7 and 28. In this way, the base unit 2 again examines the electric field on the selected channel immediately before transmitting control data to the handset unit 1.

If the second electric field detection indicates a weak electric field on the selected channel (the answer to step 30 is a weak electric field), this channel is selected (step 31). Conversely, if a strong electric field is indicated (the answer to step 30 is a strong electric field), the base unit 2 determines that the channel is not permitted to start the transmission of speech or control data to the handset unit 1 therethrough, and reads the results of the foregoing electric field detection performed at step 1 from the RAM 16a to examine electric field states on the respective channels belonging to the channel group 1 (step 32). If channels presenting a weak electric field are found (the answer to step 32 is that channels presenting a weak electric field are found in the channel group 1), a channel presenting a weak electric field is randomly selected from those in the channel group 1, followed by the flow proceeding to step 35. On the other hand, if all the channels of the channel group 1 also present a strong electric field (the answer to step 32 is that all the channels of the channel group 1 present a strong electric field), a channel is randomly selected from all the channels belonging to the channel group 1 (step 34), followed by the flow proceeding to step 35.

In this way, after a channel is selected by steps 31, 33 and 34, information on the selected channel is provided to the radio controller 21 at step 35 to control the channel setting, thereby setting a transmission frequency for the radio transmitter 18 and a reception frequency for the radio receiver 19 in the base unit 2 to the frequency of the selected channel.

Next, the information on the channel selected by the foregoing procedure is written into control data (step 36), and the control data is transmitted to the handset unit 1 (step 37).

While in the foregoing embodiment, the electric field detection is performed only once before the transmission of control data, a different channel may be selected from the channel group 2 to perform the electric field detection any number of times if time is available therefor.

Instead of preferentially selecting a channel of the channel group 2, as is done in the second embodiment, a channel may be selected from all the channels belonging to the channel groups 1 and 2. In this embodiment, a channel is preferentially selected from the channel group 2 because the channels belonging to the channel group 2 advantageously suffer from less interference from other cordless telephone apparatuses when a speech state is entered after the radio link has been established.

Subsequently, processing at steps 14–17 are performed similarly to steps 14–17 in FIG. 3, and the base unit 2 is set into a standby state.

As described above, according to the second embodiment, the base unit detects the electric field state on the speech channel immediately before transmitting control data to the handset unit, in addition to the electric field detection in the standby state. Since the electric field state is detected on the speech channel immediately before a speech communication is started, more accurate information on the electric field state on the speech channel can be provided than in the first embodiment, and the channels belonging to the channel group 2 can be utilized more effectively.

(Embodiment 3)

Figure 7:
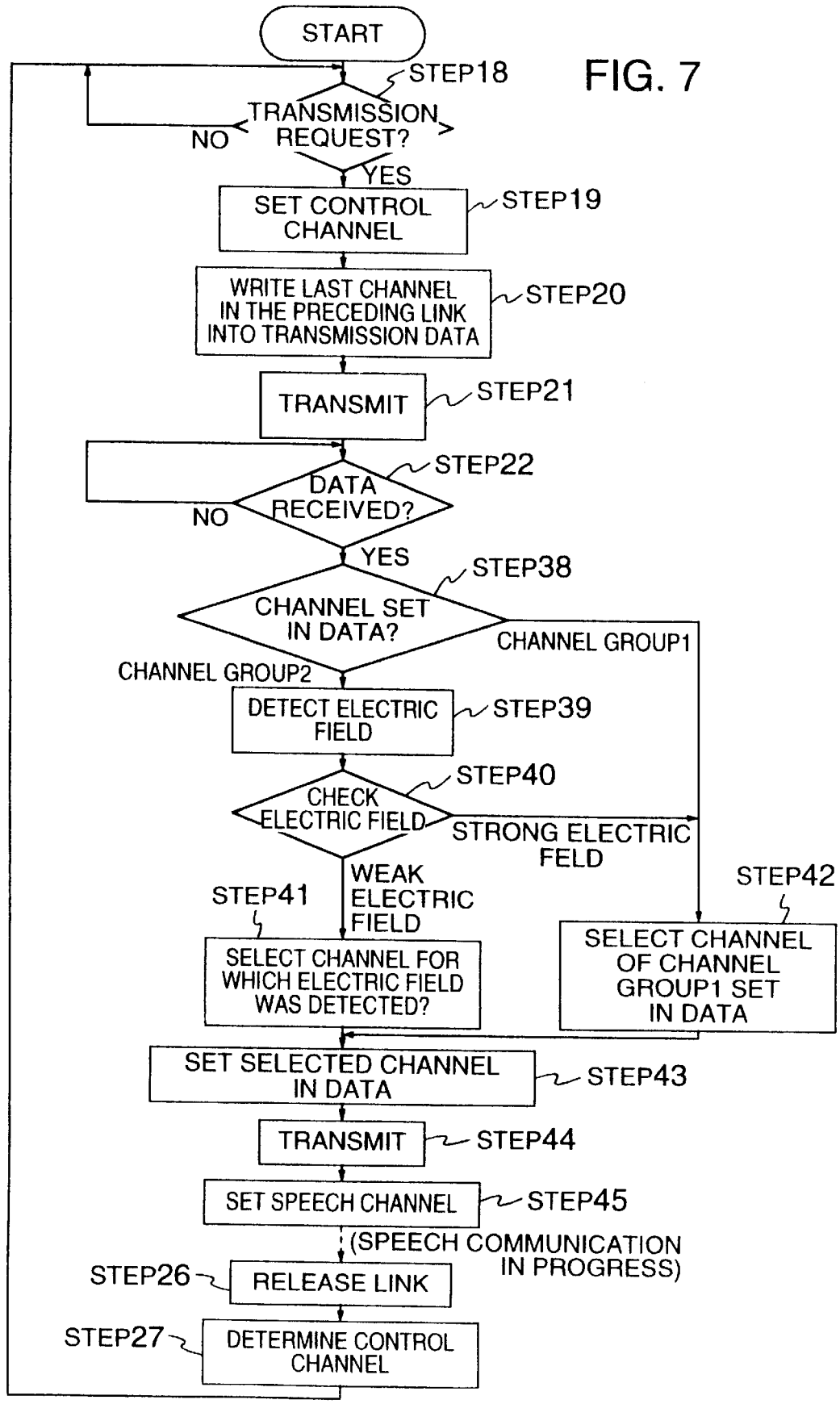
FIG. 7 is a flow chart representing operation steps executed when a radio link is formed for the handset unit of the cordless telephone apparatus according to the third embodiment of the present invention.

In a third embodiment, operation steps for again detecting an electric field on a channel selected as a speech channel by the electric field detector 12 immediately before the handset unit 1, after receiving control data from the base unit 2, returns the control data to the base unit 2 are added to the operation steps required to form the radio link for the cordless telephone apparatus in the second embodiment. The third embodiment also employs a main hardware configuration similar to that of the first embodiment shown in FIGS. 1 and 2. FIG. 7 is a flow chart representing the operation steps executed for forming a radio link for the handset unit of the cordless telephone apparatus according to the third embodiment. Only different aspects from the second embodiment will be described below with reference to FIG. 7. It should be noted that the operation of the base unit in the second embodiment represented by FIG. 6 is also performed in the second embodiment.

At steps 18–22, processing similar to that of the first embodiment is performed. When a channel indicated by information written into control data from the base unit 2 belongs to the channel group 2 (step 38), the handset unit 1 examines an electric field on the channel using the electric field detector 12, before returning the control data to the base unit 2 (step 39). If this electric field detection (step 40) indicates that the channel presents a weak electric field, this channel is determined as a speech channel (step 41).

If the channel presents a strong electric field, this channel is not used, determining that the channel is not permitted to start the transmission of speech or control data to the base unit 2 therethrough. For such a case, the base unit 2 has found an empty channel also from the channel group 1, and transmits to the handset unit 1 not only the control data carrying the information on the channel selected from the channel group 2 but also control data carrying information on the channel selected from the channel group 1 at the same time.

If the handset unit 1 receives this control data, or if information contained in the control data from the base unit 2 indicates a channel belonging to the channel group 1 at step 38, the channel is determined to be a speech channel (step 42).

The handset unit 1 stores information indicative of the speech channel determined at step 41 or 42 into the RAM 6b, writes this information indicative of the speech channel into control data (step 43), and transmits this control data back to the base unit 2 for acknowledgement (step 44). In this way, the information on the speech channel transmitted from the base unit 2 to the handset unit 1 is returned to the base unit 2, whereby the base unit 2 can acknowledge that the information on the speech channel has transmitted to the handset unit 1.

The handset unit 1, after sending the information on the speech channel to the base unit 2, provides the radio controller 11 with the information on the speech channel stored in the RAM 6b to control the channel setting, thus setting a transmission frequency for the radio transmitter 8 and a reception frequency for the radio receiver 9 to the frequency of the channel, through which a speech communication is enabled (step 45). Subsequently, the handset unit 1 performs processing at steps 26 and 27, similar to steps 26 and 27 in FIG. 4, and returns to the standby state.

As described above, according to the third embodiment, the handset unit 1 also detects an electric field on a channel selected as a speech channel immediately before the handset unit 1, after receiving control data from the base unit 2, returns the control data to the base unit 2, in addition to the electric field detection performed by the base unit 2. Therefore, since the electric field state on the speech channel is detected immediately before a speech communication is started, more accurate information on the electric field on the speech channel can be provided than in the second embodiment, and the channels belonging to the channel group 2 can be utilized more effectively. Further, since the handset unit 1 is likely to be used remotely from the base unit 2 in many cases, both the handset unit 1 and the base unit 2 examine the electric field state on the speech channel, thereby providing communications with much less noise.

(Embodiment 4)

Figure 8:
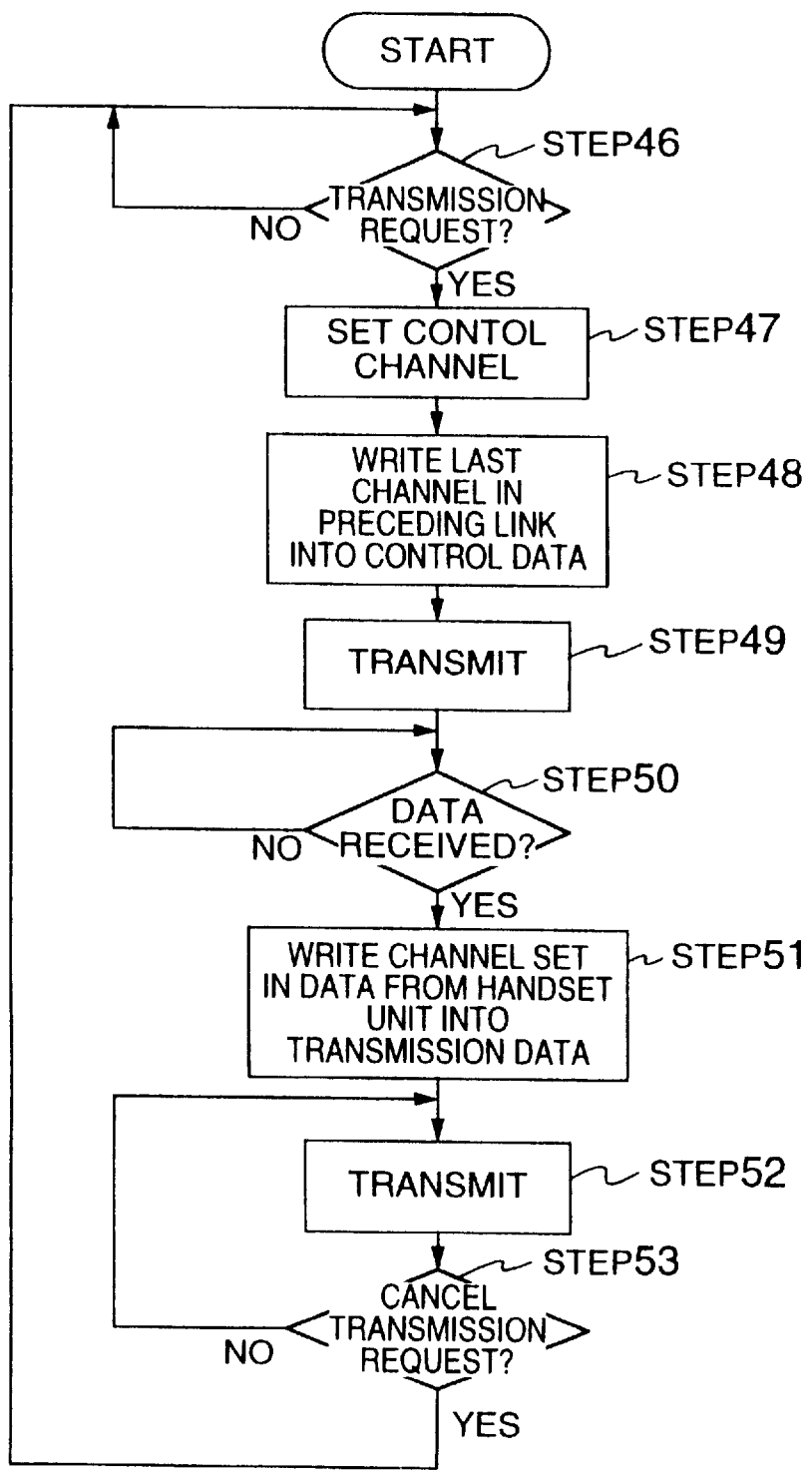
FIG. 8 is a flow chart representing operation steps executed when a radio link is formed for the base unit of the cordless telephone apparatus according to a fourth embodiment of the present invention.
Figure 9:
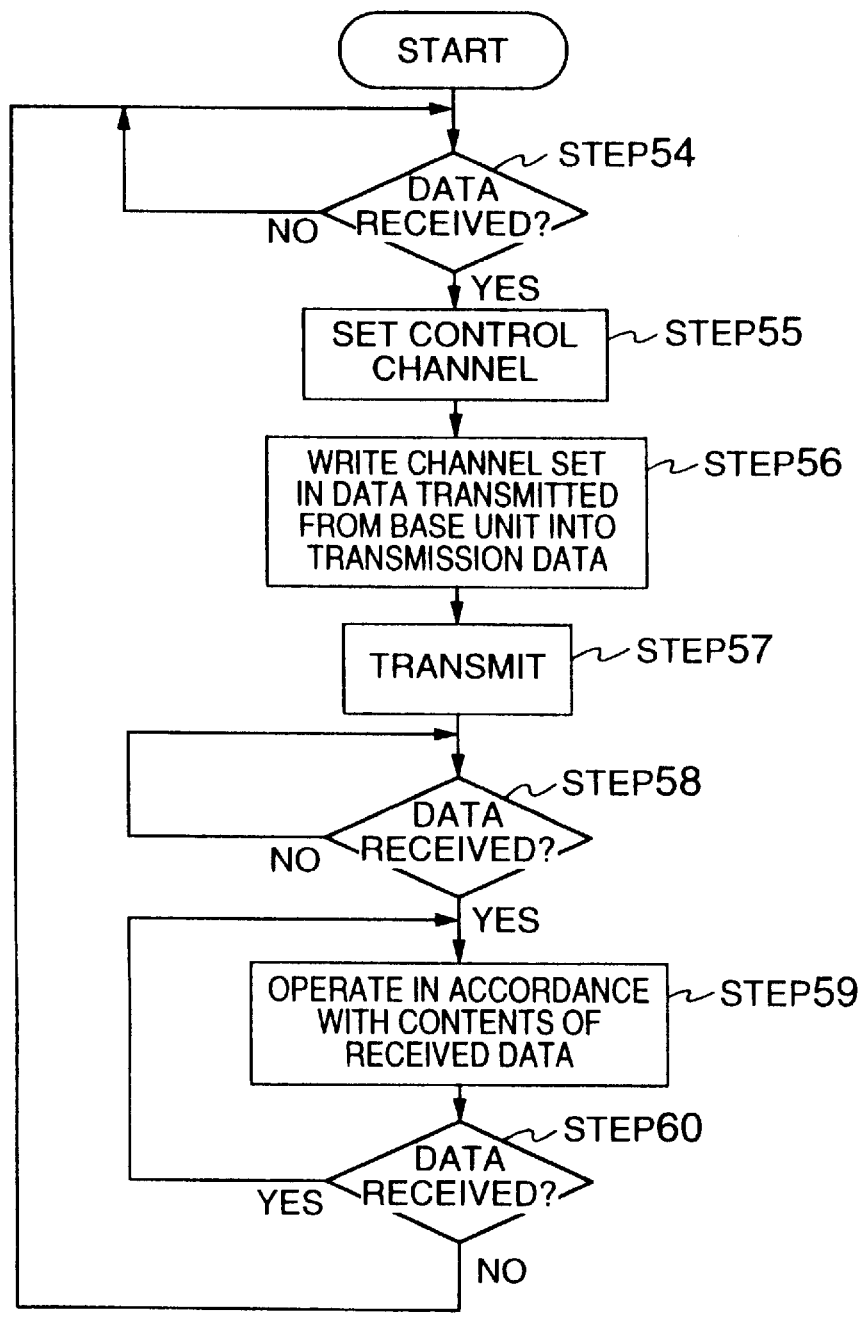
FIG. 9 is a flow chart representing operation steps executed when a radio link is formed for the handset unit of the cordless telephone apparatus according to the fourth embodiment of the present invention.

FIG. 8 is a flow chart representing operation steps executed when a radio link is formed for the base unit of the cordless telephone apparatus according to a fourth embodiment. Briefly, the fourth embodiment features that calling sound is generated in response to a transmission request from the base unit prior to forming the radio link. This example shows, however, a case where the handset unit 1 and the base unit 2 only transmit and receive control data without performing communications relative to speech sound. FIG. 9 is a flow chart representing operation steps executed when the radio link is formed for the handset unit according to the fourth embodiment. This embodiment also employs a main hardware configuration similar to that of the first embodiment shown in FIGS. 1 and 2.

Referring specifically to FIG. 8, the base unit 2 is waiting for a transmission request in a standby state (step 46). When the user manipulates the manipulation section 24 on the base unit 2, a transmission request is generated for starting a communication with the handset unit 1. The base unit 2, in response to the transmission request, sets the radio controller 21 to a control channel determined as described above (step 47). Then, the base unit 2 writes the last channel used when the radio link was formed at the preceding time into control data (step 48), and transmits this control data to the handset unit 1 (step 49).

Referring next to FIG. 9, the handset unit 1 examines the control data received through the control channel, which has been set as described above, in the standby state (step 54). The handset unit 1, after receiving the control data from the base unit 2, tunes a transmission frequency for the radio controller 11 to the frequency of the control channel which has been sent to the handset unit 1 through the control data from the base unit 2 (step 55). Then, the handset unit 1 writes channel information contained in the control data from the base unit 2 into its own control data (step 56), and transmits this control data to the base unit 2 (step 57).

Referring again to FIG. 8, the base unit 2, after receiving the control data from the handset unit 1 (step 50), sets a channel indicated by the channel information contained in the control data from the handset unit 1 (step 51), and continues the transmission to the handset unit 1 until the transmission request, such as generating the calling sound or the like, is canceled (step 53).

The handset unit 1, when receiving the control data from the base unit 2 (step 58 in FIG. 9), executes an operation in accordance with the contents of the control data (step 59). If the control data instructs the generation of the calling sound, the handset unit 1 generates the calling sound, and continues the operation until the control data is canceled (step 60).

Afterward, if the user manipulates the telephone apparatus for a call, a speech channel is determined by the operation steps similar to those in the first–third embodiments, and then a speech state is entered.

As described above, according to the fourth embodiment, even when control data only is transmitted and received, a channel belonging to the channel group 1 is usually selected when the radio link is formed, so that the radio link can be formed in a reduced time irrespective of the presence or absence of an electric field on the channel.

(Embodiment 5)

While both the handset unit 1 and the base unit 2 perform the processing for determining the control channel by the same method in the foregoing embodiments, either the handset unit 1 or the base unit 2 only may perform the processing for determining the control channel for forming the radio link at the next time. In a fifth embodiment, data indicative of the number of a channel used as the control channel is written without fail into control data transmitted between the base unit 2 and the handset unit 1. Also, in the fifth embodiment, in the operation steps required to form the radio link for the cordless telephone apparatus, the handset unit 1, when receiving the control data from the base unit 2, detects an electric field on a speech channel by the electric field detector 12 before returning the control data to the base unit 2. Detailed explanation will be given below with reference to FIGS. 10, 11 and 12. The fifth embodiment also employs a main hardware configuration similar to that of the first embodiment shown in FIGS. 1 and 2.

Figure 12:
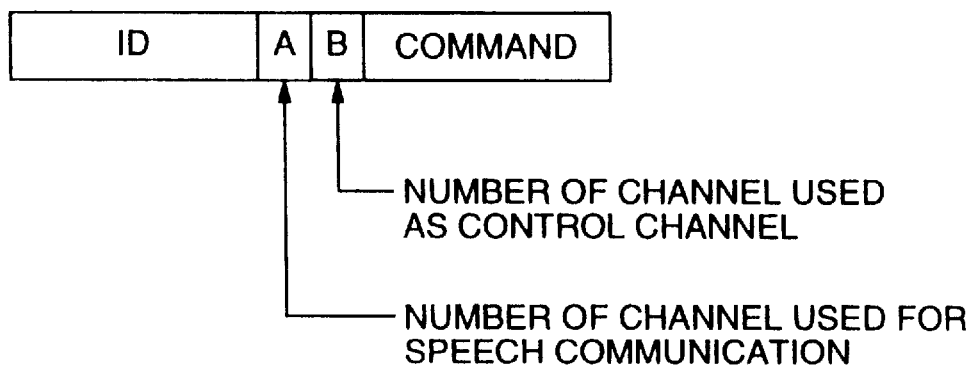
FIG. 12 is a diagram showing a format for transmission data which is transmitted from the base unit to the handset unit.

FIG. 12 shows a format for control data transmitted from the base unit 2 to the handset unit 1. Referring specifically to FIG. 12, the control data sent from the base unit 2 to the handset unit 1 reserves bits for writing information on the control channel and for writing information on the speech channel. A field A is reserved for writing information on a channel selected from the channel group 2, and a field B for writing information on a channel selected from the channel group 1.

For example, when the base unit 2 selects a control channel from the channel group 1, the channel information is written into the field B in the control data to be transmitted from the base unit 2 to the handset unit 1, as shown in FIG. 12. Also, when the base unit 2 selects a speech channel from the channel group 2, the channel information is written into the field A in the control data. The handset unit 1 extracts the channel information from the control data transmitted from the base unit 2, and stores it into the RAM 6b in the controller 6 for later use.

In the base unit 2, the latest information on a channel belonging to the channel group 1, which was able to serve as the control channel, is usually stored in the channel memory 26. For example, even if the handset unit 1 starts the transmission, the base unit 2, upon receiving control data from the handset unit 1, stores the channel information contained in this control data into the channel memory 26.

The contents stored in the channel memory 25 of the handset unit 1 also indicates the control channel conforming to the base unit 2. More specifically, the channel information (on a channel of the channel group 1) in the control data constantly sent from the base unit 2 is stored into the channel memory 25 of the handset unit 1 to update the contents therein. The channel information stored in the channel memory 26 of the base unit 2 and in the channel memory 25 of the handset unit 1 provides the latest information on a channel which is least susceptible to interference in the channel group 1. The handset unit 1, for example, utilizes the channel indicated by the information stored in the channel memory 25, as a control channel when it initially transmits radio waves.

In addition, information indicative of a speech channel which was last used in the preceding radio link remains in the RAM 6b of the handset unit 1.

Figure 10:
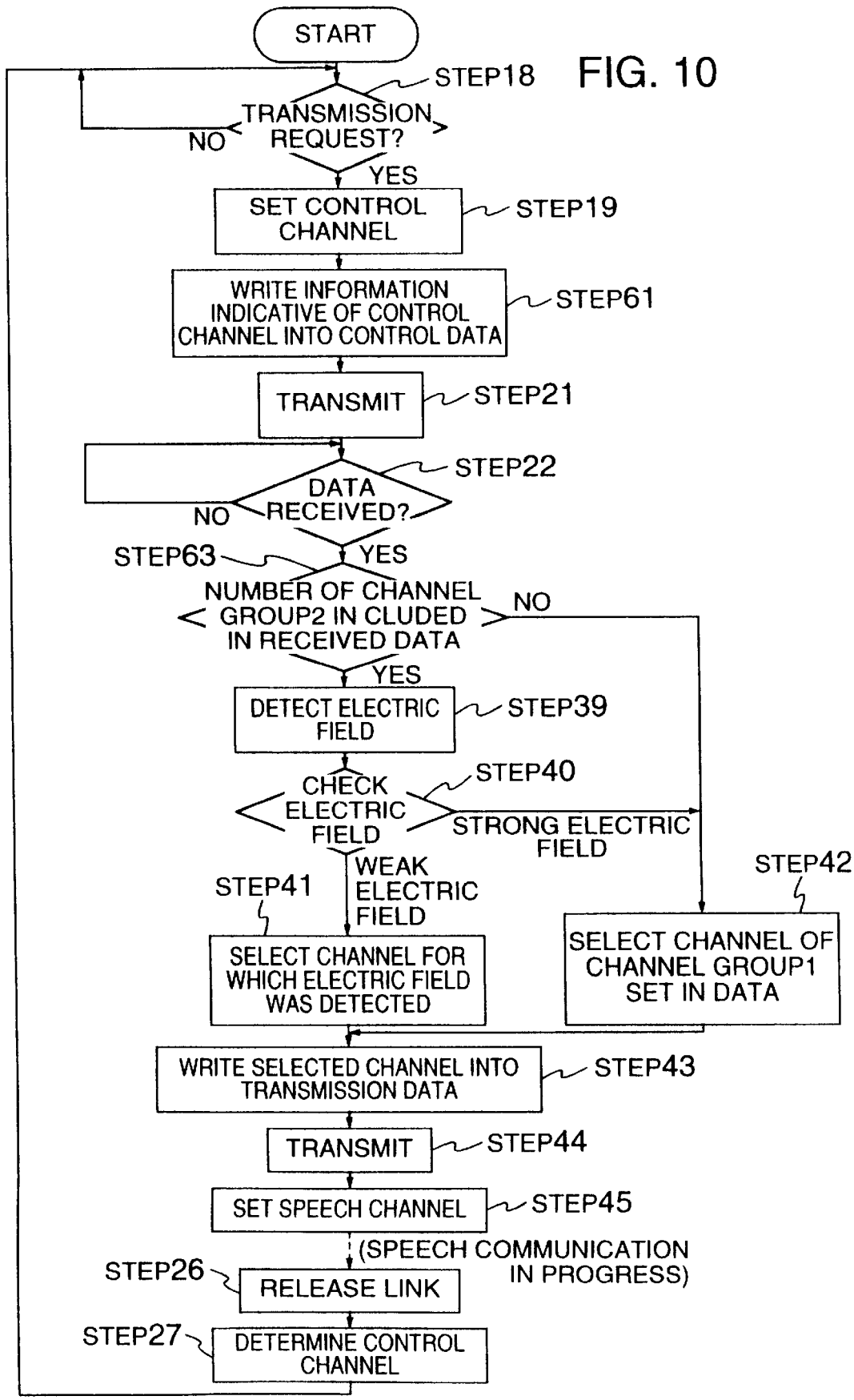
FIG. 10 is a flow chart representing operation steps executed when a radio link is formed for the handset unit of the cordless telephone apparatus according to a fifth embodiment of the present invention.

Operation steps executed by the handset unit 1 and the base unit 2 will be described below in detail. FIG. 10 is a flow chart representing operation steps of the handset unit 1. The handset unit 1 is waiting for a transmission request in a standby state (step 18). For example, when the user manipulates the manipulation section 14 on the handset unit 1 to generate a transmission request for starting a communication with the base unit 2, the handset unit 1, in response to this request, first provides the radio controller 11 with the channel information (information on a channel belonging to the channel group 1) stored in the channel memory 25 to set a channel (step 19). Then, the handset unit 1 writes the same channel information stored in the channel memory 25 into control data (step 61), and transmits this control data to the base unit 2 (step 21). In summary, this transmission is performed through the channel belonging to the channel group 1 to send the information indicative of the channel used for this transmission to the base unit 2.

Figure 11:
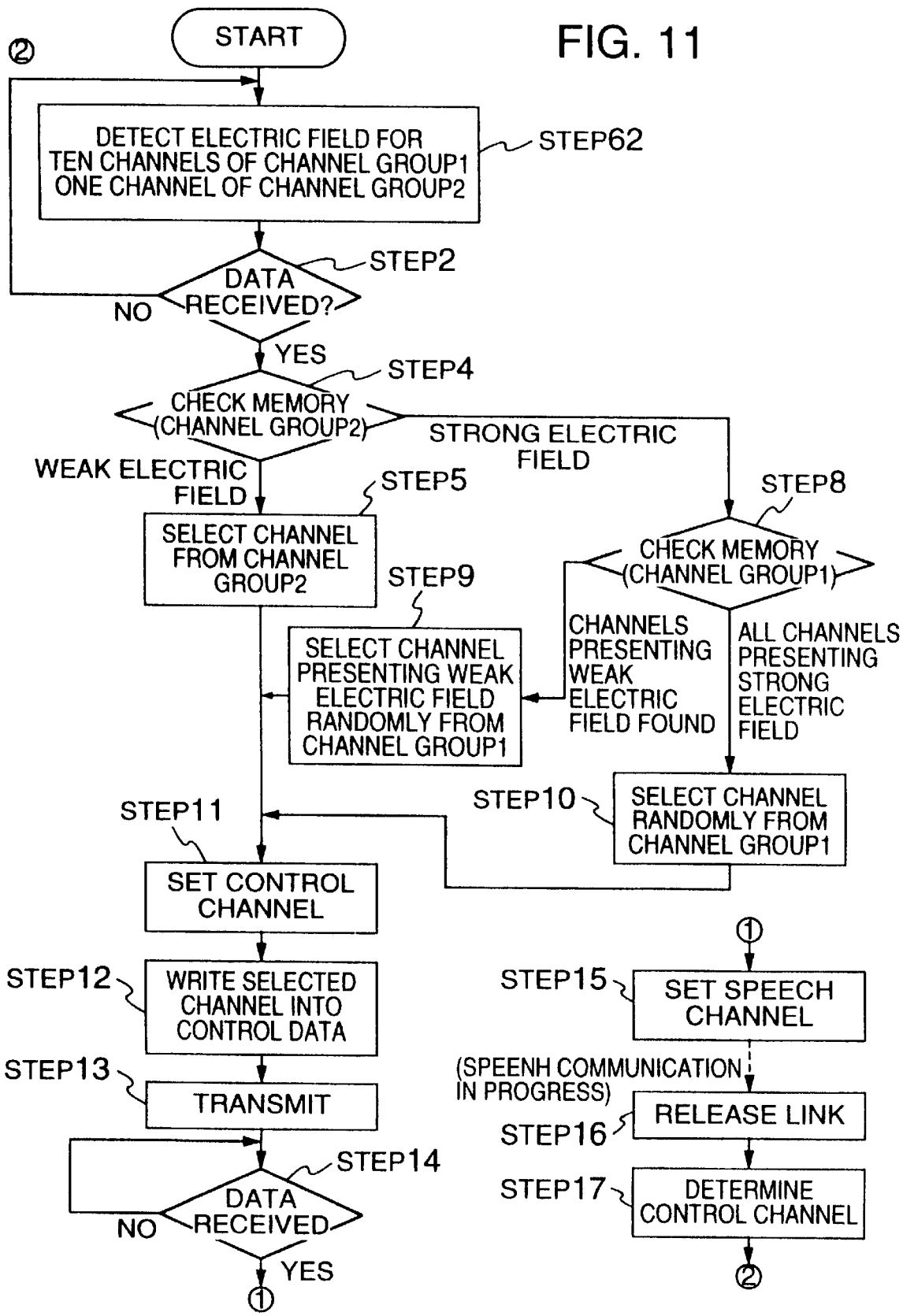
FIG. 11 is a flow chart representing operation steps executed when a radio link is formed for the base unit of the cordless telephone apparatus according to a fifth embodiment of the present invention.

FIG. 11 shows operation steps executed by the base unit 2. The base unit 2 in a standby state is monitoring the presence or absence of a signal received from the handset unit 1 and also detecting electric fields of all the channels belonging to the channel group 1 and a channel of the channel group 2 by the electric field detector 22 so as to store the latest information indicative of the results of the detection into the RAM 16a in the controller 6 (step 62).

The base unit 2, when receiving the control data from the handset unit 1 (the answer to step 2 is "YES"), stores the channel information contained in the control channel into the channel memory 26.

Next, the base unit 2 reads the results of the electric field detection performed at the foregoing step 1 from the RAM 16a and examines an electric field state on the one channel of the channel group 2 (step 4). If it is determined at step 4 that the channel of the channel group 2 presents a weak electric field (the channel is not being used by any other user), the base unit 2 selects the channel of the channel group 2 (step 5), followed by the flow proceeding to step 11.

On the other hand, if it is determined at step 4 that the channel of the channel group 2 presents a strong electric field (the channel is being used by another user), the base unit 2 reads the results of the electric field detection for the channel group 1 performed at the foregoing step 1 from the RAM 16a to examine electric field states on the channels belonging to the channel group 1 (step 8). If channels presenting a weak electric field are found within the channels of the channel group 1 (the answer to step 8 is that channels presenting a weak electric field are found), a channel is randomly selected from the channels presenting a weak electric field (step 9). However, if all the channels of the channel group 1 also present a strong electric field (the answer to step 8 is that all the channels present a strong electric field), a channel is randomly selected from all the channels belonging to the channel group 1 (step 10). After the channel is selected at step 9 or 10, the flow proceeds to step 11.

At steps subsequent to step 11, the information on the speech channel selected at step 5, 9 or 10 is transmitted to the handset unit 1 through the control channel, such that the base unit 2 and the handset unit 1 proceed to a speech state with their transmission/reception channels set to the speech channel. Specifically, the information on the control channel stored in the channel memory 26 at that time (information sent through the control data from the handset unit 1 as described above) is provided to the radio controller 21 so that the radio controller 21 sets a channel. Then, information on the selected speech channel is written into the control data (step 12), and this control data is transmitted to the handset unit 1 (step 13). In other words, the control data is transmitted through the same channel as the transmission/reception channel set at the handset unit 1 at that time. The base unit 2 waits for the control data to be returned from the handset unit 1 (step 14).

Incidentally, even if a channel of the channel group 2 presents a weak electric field at the base unit 2, the same channel may present a strong electric field at a location of the handset unit 1. In this case, the handset unit 1 is not permitted to transmit data through this channel, as stipulated in the standard. For such a situation, the base unit 2 has previously found an empty channel also from the channel group 1 and written information on a channel selected from the channel group 1 into the field A of the control data and information on the empty channel found from the channel group 1 into the field B of the same control data as an alternative to the channel of the channel group 2, and simultaneously transmits the control data containing the information indicative of two channels to the handset unit 1.

The handset unit 1 performs the following operations at and after step 22. The handset unit 1, when receiving the control data from the base unit 2 (the answer to step 22 is "YES"), extracts the channel information contained in the control data from the base unit 2, stores the extracted channel information into the RAM 6b, and determines whether the control data has information on a channel belonging to the channel group 2 (step 63). If no information on a channel belonging to the channel group 2 is found in the control data, the handset unit 1 determines a channel belonging to the channel group 1 indicated by the channel information in the control data as a speech channel (step 42).

It should be noted that the channel information on a channel belonging to the channel group 1 contained in the field B in the control data from the base unit 2 is left in the channel memory 25 of the handset unit 1 as information on a control channel, and the channel indicated by this information is used as a control channel when the handset unit 1 initially transmits radio waves for starting a communication at the next time.

If the channel information on a channel belonging to the channel group 2 is found in the control data at step 63, the handset unit 1 utilizes the electric field detector 12 to detect an electric field state on that channel, before transmitting control data to the base unit 2 therethrough (step 39). If the electric field detection indicates that the channel (belonging to the channel group 2) informed from the base unit 2 through the control data also presents a weak electric field at a location of the handset unit 1 (step 40), the handset unit 1 determines this channel as a speech channel (step 41).

On the other hand, if the channel (belonging to the channel group 2) informed from the base unit 2 through the control data also presents a strong electric field at the location of the handset unit 1, this channel cannot be used for starting a communication therethrough since the standard does not permit the cordless telephone apparatus to use a channel presenting a strong electric field. For this situation, the base unit 2 has previously found an empty channel also from the channel group 1 and written information on the channel found from the channel group 1 into the control data together with the information on a channel selected from the channel group 2, such that the base unit 2 transmits the channel information indicative of the two channels to the handset unit 1. Thus, in this case, where the channel of the channel group 2 presents a strong electric field at the location of the handset unit 1, the flow proceeds to step 42 to determine the channel belonging to the channel group 1 indicated by the channel information sent from the base unit 2 as a speech channel.

The handset unit 1 then writes information indicative of the speech channel determined at step 41 or 42 into the control data (step 43), and returns this control data to the base unit 2 for acknowledgement (step 44). In this way, the information on the speech channel sent from the base unit 2 to the handset unit 1 is returned to the base unit 2, so that the base unit 2 can acknowledge that the information on the speech channel has been transmitted to the handset unit 1.

The base unit 2, when receiving the control data from the handset unit 1 (the answer to step 14 is "YES"), provides the radio controller 21 with the channel information extracted from the control data (step 15) to control the channel setting, whereby a transmission frequency for the radio transmitter 18 and a reception frequency for the radio receiver 19 in the base unit 2 are set to the frequency of the channel indicated by the channel information, so that this channel is used as a speech channel. At this time, the control data returned from the handset unit 1 may include information on a channel belonging to the channel group 1 as an alternative channel which has been previously transmitted from the base unit 2 to the handset unit 1, instead of information on a channel belonging to the channel group 2. In this case, the information on the channel belonging to the channel group 1 is provided to the radio controller 21 at step 15 to control the channel setting.

The handset unit 1, after sending the speech channel information to the base unit 2 at step 44, provides the radio controller 11 with information on the speech channel determined as described above to control the channel setting, whereby a transmission frequency for the radio transmitter 8 and a reception frequency for the radio receiver 9 are set to the frequency of the speech channel, thus enabling a speech communication through this channel (step 45).

It will be understood that the user may switch the channel by pushing a channel switching button in the manipulation section 14 on the handset unit 1. When the user switches the channel, the speech channel, set as described above, is used by the handset unit 1 and the base unit 2 for transmitting and receiving speech and control data until the radio link is released.

Afterward, when the user manipulates the handset unit 1 to end the speech communication, the handset unit 1 executes steps 26 and 27 similar to those shown in FIG. 7 and returns to the standby state. The base unit 2 also executes steps 16 and 17 similar to those shown in FIG. 3 and returns to the standby state.

In this way, the handset unit 1 and the base unit 2 can use the same channel as the control channel, through which the transmission is permitted without examining an electric field state on that channel. Data on the number of the thus determined channel is stored in the respective channel memories of the handset unit 1 and the base unit 2 for use in forming a radio link at the next time.

As described above, according to the fifth embodiment, the handset unit 1 examines an electric field state on a speech channel immediately before starting the transmission to the base unit 2, in addition to the electric field detection performed by the base unit 2 in the standby state. Since the electric field state on the speech channel is again detected immediately before starting a speech communication, more accurate information on the electric field on the speech channel can be provided, thus reducing the possibility of interference and so on. Also, the handset unit 1 may be used remotely from the base unit 2 so that a channel, which is detected to present a weak electric field at a location of the base unit 2, may be determined to present a strong electric field at a location of the handset unit 1. In this case, using the channel is prevented.

We claim:

1. A cordless telephone apparatus which is capable of using a plurality of first channels through which transmission is permitted irrespective of respective electric field states of the plurality of first channels and a plurality of second channels through which transmission is permitted in a state of a weak electric field of each of the plurality of second channels, the apparatus comprising:

a baseset unit and a handset unit, said baseset unit transmitting and receiving speech signals through a telephone line, and said baseset unit and said handset unit each having a radio receiver and a radio transmitter for communication between the baseset unit and the handset unit and control means for using at least one of said first channels when the radio transmitter of said baseset unit or said handset unit starts transmission.

2. A cordless telephone apparatus which is capable of using a plurality of first channels through which transmission is permitted irrespective of respective electric field states of said plurality of first channels and a plurality of second channels through which transmission is permitted in a state of a weak electric field of each of the plurality of second channels, the apparatus comprising:

a baseset unit and handset unit, said baseset unit transmitting and receiving speech signals through a telephone line, said baseset unit and said handset unit each including a radio receiver and a radio transmitter for communication between the baseset unit and the handset unit;

first control means for using at least one of said first channels to establish a radio link between the baseset unit and the handset unit when the radio transmitter of said baseset unit or said handset unit starts transmission, and second control means for selecting a speech channel from the first and second channels, after the radio link has been formed.

3. A cordless telephone apparatus comprising:

a base unit for transmitting and receiving speech signals through a telephone line, said base unit having a radio transmitter and a radio receiver for communications in a plurality of channels; and a handset unit having a radio receiver and a radio transmitter for communications with the radio transmitter and the radio receiver of said base unit in the plurality of channels, wherein said handset unit and said base unit each include a channel information memory for storing information indicative of a control channel of the plurality of channels;

at least one of said handset unit and said base unit includes an electric field detecting means for detecting an electric field in the plurality of channels; and said handset unit and said base unit each include:

first control means for transmitting radio waves through the control channel of the plurality of channels indicated by the information stored in said channel information memory when initially transmitting radio waves for forming a radio link;

second control means for controlling to select a speech channel from the plurality of channels, after the radio link has been formed; and third control means for selecting a new control channel from a subplurality of the plurality of channels through which transmission is permitted irrespective of respective electric field states of said subplurality, and for storing information indicative of the new control channel into said channel information memories of said handset unit and said base unit.

4. A cordless telephone apparatus comprising:

a base unit for transmitting and receiving speech signals through a telephone line, said base unit having a radio transmitter and a radio receiver for communications over a plurality of channels; and a handset unit having a radio receiver and a radio transmitter for communications with the radio transmitter and the radio receiver of said base unit over said plurality of channels, wherein said handset unit and said base unit each include a channel information memory for storing information indicative of a control channel of the plurality of channels;

at least one of said handset unit and said base unit includes an electric field detecting means for detecting an electric field in the plurality of channels; and said handset unit and said base unit each include:

first control means for transmitting radio waves through the control channel indicated by the information stored in said channel information memory when initially transmitting radio waves for forming a radio link between the base unit and the handset unit;

third control means for selecting a new control channel from a subplurality of the plurality of channels through which transmission is permitted irrespective of respective electric field states of the subplurality, and for storing information indicative of the new control channel into said channel information memories of said handset unit and said base unit; and fourth control means for controlling, after the radio link has been formed, to select a speech channel preferentially from a second subplurality of the plurality of channels through which transmission is not permitted unless an electric field state is examined to detect a weak electric field on said second subplurality of channels.

5. A cordless telephone apparatus according to claim 3, wherein:

said base unit further includes an electric field state memory for storing a detected result of an electric field state on each channel of the plurality of channels, such that said base unit in a standby state detects the electric field states on all the plurality of channels and stores the detected results into said electric field state memory.

6. A cordless telephone apparatus according to claim 5, wherein:

said base unit detects an electric field state on the speech channel immediately before transmitting control data to said handset unit.

7. A cordless telephone apparatus according to claim 6, wherein:

said handset unit, after receiving the control data from said base unit, detects the electric field state on the speech channel immediately before returning the control data to said base unit.

8. A cordless telephone apparatus according to claim 3, wherein:

only one of said handset unit and said base unit performs channel selection processing for forming a subsequent radio link;

a control data transmitted between said base unit and said handset unit includes a field for writing the information indicative of the control channel; and when said one of said base unit and said handset unit transmits the control data to the other, the information indicative of the control channel is written into said field before said control data is transmitted.

9. A cordless telephone apparatus according to claim 3, wherein:

said base unit and said handset unit each include an electric field state memory for storing detected results of an electric field state on each channel of the plurality of channels; and said base unit uses said electric field detector to examine electric field states for all channels belonging to a first group of the plurality of channels through which transmission is permitted irrespective of their electric field states and for one channel belonging to a second group of the plurality of channels through which transmission, is not permitted unless an electric field state is examined to detect a weak electric field thereon, and stores the detected results into said electric field state memory.

10. A cordless telephone apparatus comprising:

a base unit for transmitting and receiving speech signals through a telephone line, said base unit having a radio transmitter and a radio receiver for communications over a plurality of channels; and a handset unit having a radio receiver and a radio transmitter for communications with the radio transmitter and the radio receiver of said base unit over said plurality of channels;

wherein said handset unit and said base unit each include a channel information memory for storing information indicative of a control channel of said plurality of channels;

at least one of said handset unit and said base unit includes an electric field detector for detecting an electric field on the plurality of channels; and said handset unit and said base unit each include:

first control means for transmitting radio waves through the control channel indicated by the information stored in said channel information memory when initially transmitting radio waves for forming a radio link between the handset unit and the base unit;

second control means for controlling to select a speech channel from the plurality of channels, after the radio link has been formed; and third control means for performing control channel selection processing for a subsequent radio link, when releasing the radio link, and for storing information indicative of a new control channel into said channel information memory, wherein said control channel selection processing selects the new control channel from a group of channels which are included in said plurality of channels and through which transmission is permitted irrespective of electric field states on said group of channels.

11. A cordless telephone apparatus comprising:

a base unit for transmitting and receiving speech signals through a telephone line, said base unit having a radio transmitter and a radio receiver for communications over a plurality of channels; and a handset unit having a radio receiver and a radio transmitter for communications with the radio transmitter and radio receiver of said base unit over said plurality of channels;

wherein said handset unit and said base unit each include a channel information memory for storing information indicative of a control channel of the plurality of channels;

said handset unit and said base unit each include:

first control means for transmitting radio waves through the control channel indicated by the information stored in said channel information memory when initially transmitting radio waves for forming a radio link between the handset unit and the base unit; and second control means for controlling to select a speech channel from the plurality of channels, after the radio link has been formed;

wherein said base unit further includes:

an electric field detector for detecting an electric field in the plurality of channels;

third control means for selecting a new control channels from a group of channels which are included in the plurality of channels and through which transmission is permitted irrespective of electric field states on the group of channels and for storing information indicative of the new control channel into said channel information memory of said base unit; and fifth control means, operative when transmitting control data to said handset unit, for controlling to write said information indicative of the new control channel into said control data and to transmit said control data containing said information indicative of said new control channel.

12. A cordless telephone apparatus according to claim 2, wherein:

said second control means selects the speech channel from the plurality of second channels, after the radio link has been formed.

13. A cordless telephone apparatus according to claim 2, wherein:

said second control means selects the speech channel from the plurality of second channels if a channel of the second plurality of channels is available as the speech channel, after the radio link has been formed.

14. A cordless telephone apparatus according to claim 2, wherein:

said second control means selects the speech channel from the plurality of second channels after the radio link has been formed, unless all channels belonging to the plurality of second channels are found to present a strong electric field, in which case said second control means selects the speech channel from the plurality of first channels.

15. A cordless telephone apparatus of which is capable of using a plurality of first channels through which transmission is permitted irrespective of respective electric field states of the plurality of first elements and a plurality of second channels through which transmission is permitted in a state of a weak electric field of each of the plurality of second channels, the apparatus comprising:

a baseset unit and a handset unit, said baseset unit for transmitting and receiving speech signals through a telephone line, said baseset unit and handset unit each including a radio receiver and a radio transmitter for communication between said baseset unit and said handset unit, and said baseset unit and said handset unit including:

a channel information memory, first control means for using at least one of said first channels when the radio transmitter of said baseset unit or said handset unit starts transmission, and storing information indicative of said at least one of the channels into said channel information memory, and second control means for controlling to select a speech channel from the plurality of channels after the radio link has been formed.

16. A cordless telephone apparatus according to claim 1, wherein the plurality of first channels and the plurality of second channels are mutually exclusive.

17. A cordless telephone apparatus according to claim 2, wherein the plurality of first channels and the plurality of second channels are mutually exclusive.

* * * * *